United States Patent [19]

Lingorski et al.

[11] Patent Number: 4,995,732

[45] Date of Patent: Feb. 26, 1991

[54] METHOD AND APPARATUS FOR CONTINUOUS MEASUREMENT OF THE TEMPERATURE OF ELECTROCONDUCTIVE MELT AND THE THICKNESS OF REFRACTORY LINING

[75] Inventors: Nikola A. Lingorski; Mincho B. Hadjiiski; Rumen B. Yovchev; Kamen B. Spassov; Peter H. Savov, all of Sofia, Bulgaria

[73] Assignee: Nis Pri Vissh Chimikotechnologiches Ki Institut, Sofia, Bulgaria

[21] Appl. No.: 535,975

[22] Filed: Jun. 8, 1990

Related U.S. Application Data

[63] Continuation of Ser. No. 370,232, Jun. 22, 1989, abandoned.

[51] Int. Cl.$^5$ .............................................. G01K 1/12
[52] U.S. Cl. .................................................... 374/139
[58] Field of Search ............... 73/86; 374/7, 100, 101, 374/110, 112–114, 139, 142

[56] References Cited

U.S. PATENT DOCUMENTS

| | | | |
|---|---|---|---|
| 3,307,401 | 3/1967 | Bachman | 73/86 |
| 3,532,797 | 10/1970 | Lunig | 73/86 |
| 4,655,077 | 4/1987 | Purvis et al. | 73/86 |

FOREIGN PATENT DOCUMENTS

0554474 4/1977 U.S.S.R. ............................ 374/139

Primary Examiner—Robert Raevis
Attorney, Agent, or Firm—Herbert Dubno; Ronald Lianides

[57] ABSTRACT

Simultaneous measurements of the temperature are taken at different points in time along with discrete measurements of the thickness of the refractory lining of the melt vessel. The temperature are measured at two exactly fixed cross-sections spaced along a system of heat-conductive bodies, with each body having a diameter smaller than the diameter of wetting by the electroconductive melt of all the bodies, the temperature indicator being incorporated in the refractory lining. Two thermoelectric sensors are disposed at the sections at a preset distance from one another, which are beyond the consumable portion of the indicator, and a thickness indicator of the refractory lining which consists of a system of electroconductive bodies, each of which has an effective diameter smaller than the diameter of all the bodies being wetted by the respective melt, and disposed within the refractory lining and forming a preset number of numbered normally electrically open contacts which are closed as a result of the progressive wear of the refractory lining.

3 Claims, 2 Drawing Sheets

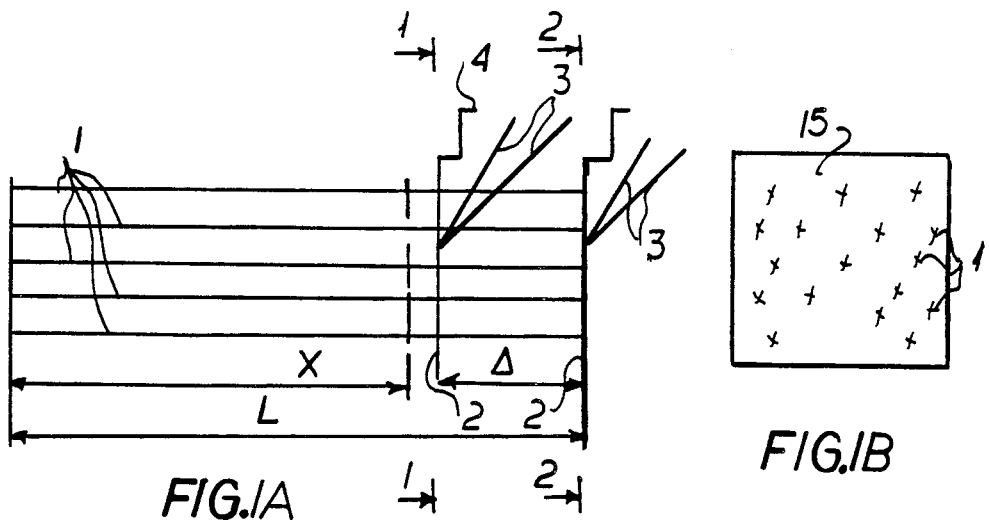
FIG.1A
FIG.1B
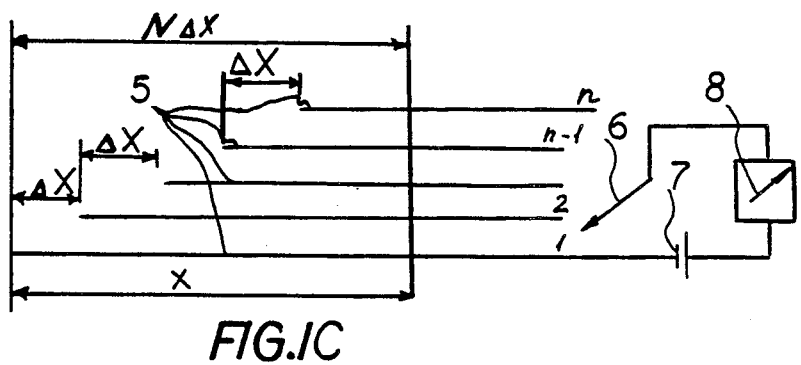
FIG.1C
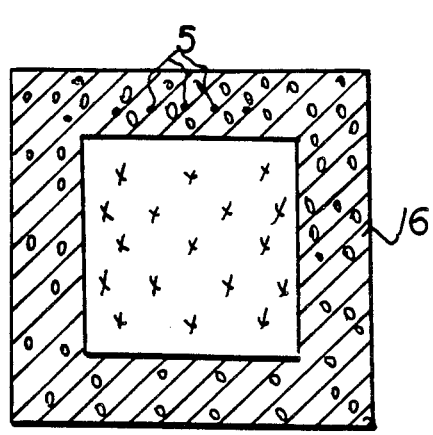
FIG.1D

METHOD AND APPARATUS FOR CONTINUOUS MEASUREMENT OF THE TEMPERATURE OF ELECTROCONDUCTIVE MELT AND THE THICKNESS OF REFRACTORY LINING

This is a continuation of co-pending application Serial No. 07/370,232 filed on 22 Jun 1989, now abandoned.

FIELD OF THE INVENTION

The invention relates to a method and an apparatus for the continuous measurement of the temperature of an electroconductive melt and the thickness of refractory lining of the melt vessel, which can find application in the measurement of the temperature of liquid cast iron, steel and other electroconductive high-temperature melts.

BACKGROUND OF THE INVENTION

A method for continuous measurement of the surface temperature of the part of the wall of the respective unit which is not in contact with the melt and of the progressively worn refractory lining is known. In this method the heated surface of a heat conductive body and the internal surface of the refractory lining are heated in the same conditions under the action of one and the same heat flow. The temperatures along the heat conductive body are measured with sensors, the signals of these sensors being connected at the same time with a measuring and a logic diagnostic circuit into a module for process interface. In the logic circuit there are checked the soundness of the respective temperature sensor and generated logic signals for indication of its functional state, which depends on the degree of wear of the lining and serves for measuring the thickness also in descrete moments, being determined accurately by the failure of the end sensor.

The drawbacks of this known method lie in the impossibility to use it for measuring the temperature of strongly active and high-temperature melts, as well as in that the thickness of the refractory lining is determined exactly only when failure of the thermoelectric sensor occurs.

An apparatus for combined measurement of the surface temperature and the thickness of the refractory lining and of the heat flow through it is known. This apparatus comprises thermoelectric sensors incorporated in a body with a heat transfer coefficient greater than the heat transfer coefficient of the refractory lining, located at different depths in the lining and connected by means of a standardizing converter and a measuring circuit to the input of a commutator, connected with the computing module by means of a block for digital interface, and to the measuring circuit there is connected a logic diagnostic circuit connected with the computing module, which consists of a filtration block for the input measurements, a block for the input memory connected to a block for automatic calibration and to a commutator for process interface.

The drawbacks of the described apparatus lie in its inapplicability for determining the temperature of strongly active high-temperature melts, in the great number of thermoelectric sensors which are irretrievably consumed during the process of measurement, in that the thickness of the refractory lining is determined accurately only by failure of the thermoelectric sensor.

OBJECTS OF THE INVENTION

It is therefore a general object of this invention to provide a method and an apparatus for continuous measurement of the temperature of an electroconductive melt and the thickness of the refractory lining in stationary and non-stationary conditions of heating or cooling without the necessity of exact knowledge of the thermophysical characteristics of the refractory lining of the respective unit, the apparatus being capable of operating in strongly active and high-temperature electroconductive media while maintaining its stability characteristics in the whole range of technological conditions in the respective unit, and to eliminate the necessity of graduation calibration before each measurement. It is also an object to provide a diagnostic system for tracking the serviceability of the apparatus and the reliability of the obtained data, ensuring an accuracy an reliability making possible its incorporation into a system for automatic process control.

SUMMARY OF THE INVENTION

The objects are achieved, according to the invention, in a method for continuous measurement of the temperature of an electroconductive melt and the thickness of the refractory lining, in which there are used simultaneous measurement of temperatures at different points, discrete measurements of the thickness of the refractory lining by means of an indicator of the thickness of the refractory lining, the temperature measurements being recorded at two fixed cross-sections along a system of heat-conductive bodies incorporated in the refractory lining with an effective diameter of each of the bodies being smaller than the diameter being wetted by the electroconductive melt, the measurement cross-sections being outside of the consumable part of the refractory lining. To start, there is effected a diagnostic test of the serviceability of the thermoelectric sensors, and the obtained results are processed, analyzed and converted to a binary code. The thickness of the refractory lining is determined in the same time interval on the basis of discrete measurements by means of the indicator for the thickness of the refractory lining to measure the progressive wear of the refractory lining in which it is mounted, and is determined by a consecutive closing of numbered, normally-open electric contacts, formed by a system of electroconductive bodies each having a length shorter than the length of the preceding body by a fixed distance. The analogue signals from the temperature indicator are converted to digital form by an analogue-to-digital converter and enter a block for primary processing. The discrete signals from the indicator of the refractory lining thickness pass via a logic analyzer and enter a block for processing digital signals. By an interface the signals of both blocks enter the computing device in which there is effected a specific solution of the general differential equation for heat conductivity in quasistationary heating of a probe having a heat-insulated effective face surface, for indirect calculation of the surface temperature of the probe and determination of its integration values, at preset dynamic initial and secondary conditions, taking into consideration the relation between the axial and the radial component of the heat flow passing through the effective face surface to the temperature indicator.

According to the invention, this object is achieved by an apparatus for continuous measurement of the temperature of the electroconductive melt and of the thickness of the refractory lining, consisting of two indicators. The temperature indicator consists of a system of heat-conductive elongated bodies of arbitrary cross section shape, with an effective diameter of each body being smaller than the diameter being wetted by the respective melt, two thermoelectric sensors being located across sections of the temperature indicator at a preset distance one from another, which are located beyond the consumable portion of the indicator. The thickness indicator of the refractory lining consists of a system of electroconductive bodies of arbitrary shape of the cross section and each having an effective diameter smaller than the diameter wetted by the respective melt, forming a preset number of consecutively numbered contacts which become electrically closed as a result of the progressive wear of the refractory lining.

The advantages of the invention lie in that it has a wide field of application in the measurement of temperatures of liquid cast iron, steel and other strongly active high-temperature-melting electroconductive melts; the sensitivity characteristics of the thermoelectric sensors are maintained constant in the whole range of operating conditions of the unit in which the melts are treated or stored; in the obtaining in digital form the indirect measurements of the temperature of the electroconductive melts at high accuracy, reliable noise suppression and low inertia which makes almost possible a continuous tracking of the temperature and the thickness of the refractory lining of the respective units; in the provision for internal diagnosis of the serviceability of both indicators; in that the apparatus is incorporated into the refractory lining of the respective unit, it has no movable or replaceable parts during operation, and it is replaced at the end of the working cycle of the unit together with its lining; in the simultaneous determination of the thickness of the refractory lining of the respective unit and the temperature of the electroconductive melt; in the ability to evaluate the temperature profile in the refractory lining; in that the apparatus is featured by adaptability to industrial manufacture and facilitated assembly in its operation; in that the developed method makes possible the use of the apparatus without an exact knowledge of the thermophysical characteristics of the refractory lining of the respective unit, as well as of the refractory material with which the unit is formed as a refractory element; in that the results are presented in a form convenient for use in a system for automatic process control with the aid of computers.

BRIEF DESCRIPTION OF THE DRAWING

The above objects, features, and advantages of the invention are explained by means of a preferred embodiment illustrated in the accompanying drawings in which:

FIG. 1A is a diagrammatic side view of a temperature indicator;

FIG. 1B is a cross-sectional view taken along line 1—1 of FIG. 1A;

FIG. 1C is a diagrammatic side view of an indicator for measuring the thickness of the refractory lining;

FIG. 1D is a cross-sectional view of an embodiment in which both indicators are combined into one single measurement module;

SPECIFIC DESCRIPTION

Figure 2:
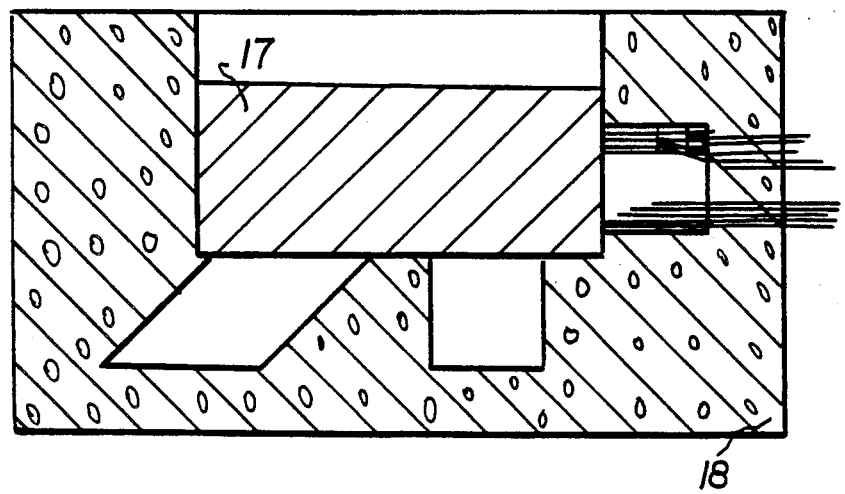
FIG. 2 is a cross-sectional view of a possible way to incorporate the apparatus in the wall or the bottom of the respective unit at a right or other angle to the wall.
Figure 3:
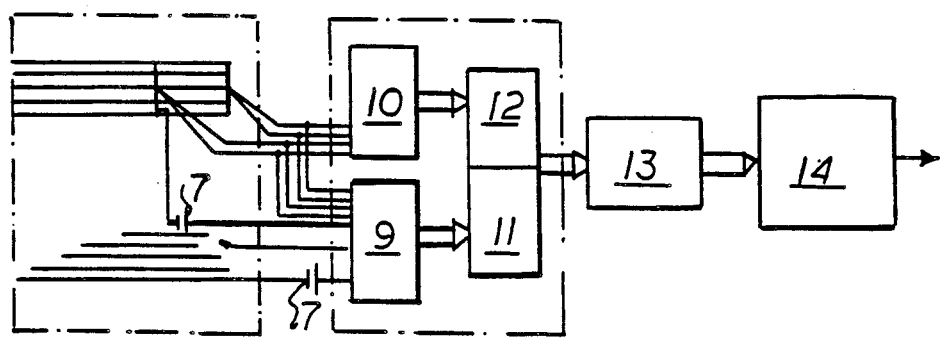
FIG. 3 illustrates the operation of the apparatus in general.

The apparatus for the continuous measurement of the temperature of an electroconductive melt 17 and the thickness of the refractory lining 18 of the units in which it is treated or stored (FIG. 3) comprises a temperature indicatory (FIG. 1A), an indicator for the thickness of the refractory lining (FIG. 1C), a logic analyzer 9, an analogue-to-digital converter 10, a block 11 for the processing of logic signals, a block 12 for primary processing of digital signals, an interface 13, and a computing device 14.

The temperature indicator (FIG. 1A) is made-up of a system or bundle of high-temperature-melting heat-conductive bodies 1 each having an arbitrary shape of the cross-section and an effective diameter of each body being smaller than the diameter being wetted and thereby melted by the electroconductive melt. The bodies are all connected at two cross-sections 1—1 and 2—2 at a distance Δ beyond the consumable portion X of the indicator to thin thermal plates 2, on which there are welded one thermoelectric sensor 3 and a reference output 4 connected to the computer 14 for determining the melt temperature.

The indicator for measuring the thickness of the refractory lining consists of a system or bundle of electroconductive bodies 5 embedded in a refractory housing 16, the length of each of body 5 differing from the preceding one by an accurately fixed constant distance. The voltage source 7 has one lead connected to the longest electroconductive body 5 and the other lead connected via a checking device 8 or a logic analyzer 9 to an electronic switch 6 which moves consecutively around the numbered normally electrically open contacts formed between the longest body and the remaining electroconductive bodies 5, more of which become electrically closed with progressing erosion of the refractory lining.

The temperature indicator is connected to an analogue-to-digital converter 10, which in turn is connected to a block 12 for primary processing of digital signals. The thickness indicator of the refractory lining is connected to a logic analyzer 9 which, in turn, is connected to a block 11 for the processing digital signals. The blocks 11 and 12 are connected via an interface 13 to a computing block 14.

It is typical in the continuous measurement of the temperature of an electroconductive melt and the thickness of the refractory lining of the units in which it is treated or stored, according to the method and the apparatus of the invention, that in each measurement of the temperature of the electroconductive melt there is first determined the degree of wear of the refractory lining and, for this purpose, the thickness indicator of the refractory lining is fed a voltage from the voltage source 7, and the discrete signal for an open or closed circuit, the closed circuit being caused by contact of the melt between the longest body 5 and another of the bodies 5 is fed to the logic analyzer 9 where it is converted into a binary code. concurrently with this operation, the reference output 4 indicates the circuit continuity of the temperature indicator by feeding the same voltage from the source 7 to one of the thermal plates 2. The signal for a defective open circuit or a good closed circuit from the temperature indicator is also fed to the logic analyzer 9, where it is converted into a binary code. The digital signals from both indicators then enter the block 11 for processing digital signals and passed onto the computer 14 where the starting thickness of the refractory lining and the serviceability of the temperature indicator are determined.

After determination of the serviceability of the temperature indicator, the temperature of the melt is measured by feeding the analoge signals from both thermoelectric sensors 3 to the automatic digital converter 10 where they are converted into a binary code. From there they enter the block 12 for primary processing of digital signals, where they are filtered, corrected and checked for reliability. From the block 12 for primary processing, the signals are fed through the interface 13 to the electronic computing device 14. In it, the signals are applied to the general differential equation for heat transfer reduced to non-dimesional form, adapted to the conditions of heat transfer through a probe having a heat-insulated face at quasiconstant temperature of its face surface. Treating the process of heating the face surface of the temperature indicator for infinitely short time intervals as quasistationary, the face temperature of the indicator coincides with the respective momentary temperature of the electroconductive melt. When the thickness of the refractory lining is known during the temperature measuring time interval, the thickness being predetermined by the thickness indicator as a result of the progressive wear of the refractory lining, there can be determined dynamically the integration values at the thus preset dynamically varying initial and secondary measuring conditions. Since, on the one part, the system of electroconductive bodies 1 of the temperature indicator have a much greater coefficient of heat transfer than the refractory housing 15 inside of which they are disposed and, on the other part, a considerably greater longitudinal surface than their effective face surface, the heat losses outwardly in a radial direction will be considerable and requires a dynamic correction in the computer 14 of the heat flow passing in the axial longitudinal direction of the system of heat-conductive bodies relative to that released in the radial direction. This correction does not depend on the thermophysical parameters of the refractory lining of the respective unit, but is reduced to the relation of two known linear dimensions L, which is reduced by the melting away of the bodies 1, and $\Delta$ (FIG. 1A).

We claim:

1. A method of continuously measuring the temperature of an electroconductive melt and thickness of a refractory lining of a vessel containing said melt, in which the temperature of said melt and the thickness of said lining are measured simultaneously, said method comprising the steps of:
   (a) disposing a temperature indicator in a refractory lining of a vessel containing an electroconductive melt, said temperature indicator having a plurality of elongated heat-conductive bodies having ends wetted by said melt, said heat-conductive bodies traversing two plates spaced therealong at a fixed distance from one another beyond a consumable portion of said bodies;
   (b) disposing a thickness indicator in said lining, said thickness indicator having a plurality of elongated electroconductive bodies, said bodies having ends facing towards said melt each differing from a preceding end by a fixed constant distance, a longest body of said electroconductive bodies having an end wetted by said melt, said longest body being connected to one pole of a current source;
   feeding temperature information signals in analog form from a thermoelectric sensor at each of said plates of said temperature indicator into an analog-to-digital converter;
   (d) feeding the temperature information signals in digital form from said converter into a primary processor;
   (e) connecting another pole of said current source of said thickness indicator consecutively to bodies other than said longest body of said electroconductive bodies to detect discrete thickness information signals;
   (f) feeding said discrete thickness information signals from said thickness indicator into a logic analyzer;
   (g) feeding the thickness information from said logic analyzer into a processor for digital signals; and
   (h) feeding both outputs from said primary processor and said processor for digital signals through an interface into a computing device for calculating the surface temperature of said ends of said heat-conductive bodies of said temperature indicator using a measured temperature differential between said two spaced apart plates of said temperature indicator, allowing for differences between logitudinal and radial components of a heat flow passing through said heat-conductive bodies according to their length as determined by the thickness of said lining as measured by said thickness indicator.

2. The method defined in claim 1 wherein in step (b), as the electroconductive melt erodes said refractory lining, additional ends of said electroconductive bodies become wetted by said melt, establishing an electrical connection between said longest body and the additional wetted bodies, whereby when a connection is provided between another pole of said current source and a contact end of said additional bodies, a closed circuit is established, providing a measurement of the thickness of said refractory lining.

3. An apparatus for measuring the temperature of an electroconductive melt and thickness of a refractory lining of a vessel containing said melt, comprising:
   a temperature indicator disposed in a refractory lining of a vessel containing an electroconductive melt, said temperature indicator being formed by a plurality of elongated heat-conductive bodies arranged in an array and having ends wetted by said melt;
   a pair of plates disposed transverse to said heat-conductive bodies and traversing and contacting said array at a fixed distance from one another beyond a melt-consumable portion of said bodies;
   a thermoelectric sensor provided on each of said plates and connected to a computer for determining the melt temperature; and
   a thickness indicator disposed in said refractory lining, said thickness indicator being formed by a plurality of elongated electroconductive bodies having ends facing towards said melt and each differing from a preceding end by a fixed constant distance, a longest body of said electroconductive bodies having an end wetted by said melt, said longest body being connected to one pole of a current source, so that as the electroconductive melt erodes said refractory lining, additional ends of said electroconductive bodies become wetted by said melt, establishing an electrical connection between said longest body and the additional exposed bodies, whereby when a connection is provided between another pole of said current source and a contact end of said additional bodies, a closed circuit is established, providing a measurement of the thickness of said refractory lining.

* * * * *